United States Patent
Abe et al.

(10) Patent No.: US 10,662,109 B2
(45) Date of Patent: May 26, 2020

(54) GLASS PANEL UNIT AND GLASS WINDOW

(71) Applicant: PANASONIC INTELLECTUAL PROPERTY MANAGEMENT CO., LTD., Osaka (JP)

(72) Inventors: Hiroyuki Abe, Osaka (JP); Eiichi Uriu, Osaka (JP); Kazuya Hasegawa, Osaka (JP); Masataka Nonaka, Osaka (JP); Tasuku Ishibashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/087,583

(22) PCT Filed: Feb. 16, 2017

(86) PCT No.: PCT/JP2017/005774
§ 371 (c)(1),
(2) Date: Sep. 21, 2018

(87) PCT Pub. No.: WO2017/169253
PCT Pub. Date: Oct. 5, 2017

(65) Prior Publication Data
US 2019/0112226 A1   Apr. 18, 2019

(30) Foreign Application Priority Data

Mar. 31, 2016 (JP) ................. 2016-072498

(51) Int. Cl.
*E06B 3/66* (2006.01)
*C03C 27/10* (2006.01)
(Continued)

(52) U.S. Cl.
CPC .............. *C03C 27/10* (2013.01); *C03C 27/06* (2013.01); *E06B 3/66* (2013.01); *E06B 3/663* (2013.01);
(Continued)

(58) Field of Classification Search
CPC .... E06B 3/6612; E06B 3/66304; E06B 3/677; E06B 2003/66338; Y02A 30/25; Y02B 80/24
See application file for complete search history.

(56) References Cited

U.S. PATENT DOCUMENTS 5,124,185 A * 6/1992 Kerr ...................... E06B 3/6612
428/34
5,270,084 A 12/1993 Parker
(Continued)

FOREIGN PATENT DOCUMENTS

CN   101617099 A   12/2009
DE   102012104360 A1   11/2013
(Continued)

OTHER PUBLICATIONS

International Search Report and Written Opinion issued in International Patent Application No. PCT/JP2017/005774 dated Apr. 25, 2017; with partial English translation.
(Continued)

*Primary Examiner* — Brian E Glessner
*Assistant Examiner* — Daniel J Kenny
(74) *Attorney, Agent, or Firm* — McDermott Will & Emery LLP

(57) ABSTRACT

An object of the disclosure is to provide a glass panel and a glass window which are configured to stably maintain a depressurized space therein even when their spacers contain a resin. A glass panel unit of an aspect of the disclosure includes: a first glass pane; a second glass pane facing the
(Continued)

first glass pane; a frame member which has a frame shape and which the first and second glass panes are bound together through; and spacers containing a resin and disposed between the first and second glass panes. A depressurized space is provided between the first glass pane and the second glass pane. The first and second glass panes are respectively to be exterior and interior panes. The first glass pane has lower ultraviolet transmittance than the second glass pane.

6 Claims, 9 Drawing Sheets

(51) Int. Cl.
    *C03C 27/06* (2006.01)
    *E06B 3/663* (2006.01)
    *E06B 3/67* (2006.01)
    *E06B 3/677* (2006.01)
    *E06B 3/667* (2006.01)

(52) U.S. Cl.
    CPC ............ *E06B 3/667* (2013.01); *E06B 3/6612* (2013.01); *E06B 3/66304* (2013.01); *E06B 3/67* (2013.01); *E06B 3/6775* (2013.01); *E06B 3/6715* (2013.01)

(56) References Cited

U.S. PATENT DOCUMENTS

| | | | |
|---|---|---|---|
| 5,461,496 A | 10/1995 | Kanada et al. | |
| 5,664,395 A * | 9/1997 | Collins | E06B 3/6612 52/786.13 |
| 6,416,375 B1 * | 7/2002 | Cho | H01J 9/261 445/25 |
| 6,436,493 B1 * | 8/2002 | Asano | E06B 3/6612 428/34 |
| 6,479,112 B1 * | 11/2002 | Shukuri | E06B 3/6612 428/34 |
| 6,541,084 B2 | 4/2003 | Wang | |
| 9,856,692 B2 * | 1/2018 | Inaoka | E06B 3/6722 |
| 2009/0324858 A1 | 12/2009 | Jaeger | |
| 2012/0162752 A1 * | 6/2012 | Kitano | B32B 17/10761 359/361 |
| 2014/0335291 A1 | 11/2014 | Hasegawa et al. | |
| 2015/0068666 A1 | 3/2015 | Abe et al. | |
| 2016/0138324 A1 * | 5/2016 | Lameris | E06B 3/6612 52/786.13 |
| 2017/0328122 A1 * | 11/2017 | Abe | C03C 27/06 |

FOREIGN PATENT DOCUMENTS

| | | |
|---|---|---|
| EP | 0421239 A2 | 4/1991 |
| JP | S63-011552 A | 1/1988 |
| JP | 06-20883 B2 | 3/1994 |
| JP | 2000-191347 A | 7/2000 |
| JP | 2001-030391 A | 2/2001 |
| JP | 2008-037094 A | 2/2008 |
| JP | 2009-102182 A | 5/2009 |
| JP | 2015-093789 A | 5/2015 |
| JP | 2016-029020 A | 3/2016 |
| WO | 9424398 A1 | 10/1994 |
| WO | 2012/157616 A1 | 11/2012 |

OTHER PUBLICATIONS

Extended European Search Report dated Mar. 8, 2019 issued in corresponding European Patent Application No. 17773801.0.

* cited by examiner

GLASS PANEL UNIT AND GLASS WINDOW

CROSS-REFERENCE OF RELATED APPLICATIONS

This application is the U.S. National Phase under 35 U.S.C. § 371 of International Patent Application No. PCT/JP2017/005774, filed on Feb. 16, 2017, which in turn claims the benefit of Japanese Application No. 2016-072498, filed on Mar. 31, 2016, the entire disclosures of which Applications are incorporated by reference herein.

TECHNICAL FIELD

The present disclosure relates to a glass panel unit and a glass window including the glass panel unit.

BACKGROUND ART

A glass panel including a pair of glass panes (hereinafter referred to as a "glass panel unit") with a depressurized space between the pair of glass panes has been known in the art. The glass panel unit is also called an "insulated glazing". The glass panel unit has excellent thermal insulation properties because the depressurized space reduces heat conduction. When a glass panel unit is manufactured, two glass panes to form a pair are bound together with a gap left between them, an inner space between the pair is evacuated, and the inner space is hermetically closed, thus forming a depressurized space there.

It has been proposed that spacers be used to maintain a sufficient thickness for the depressurized space of such a glass panel unit. The spacers are parts to be interposed between the two glass panes. The spacers are required to have some strength, and therefore, a metal is one of well-known materials for the spacers. Meanwhile, spacers made of a polymer have also been disclosed as in Patent Literature 1, for example.

When a polymer (a resin) is employed as a material for the spacers, light (an electromagnetic wave) such as ultraviolet radiation passing through glass and striking the spacers made of the resin would make the spacers easily degradable, which is not beneficial. Spacers easily degrade when included, in particular, in windows and the like directly exposed to exterior ultraviolet radiation. Degradation of the spacers leads to generation of gas from the resin, which increases pressure in the inner space, and thus, it may no longer be possible to securely maintain the depressurized space.

CITATION LIST

Patent Literature

Patent Literature 1: U.S. Pat. No. 6,541,084 B2

SUMMARY

It is an object of the present disclosure to provide a glass panel and a glass window which are configured to stably maintain a depressurized space thereof even when their spacers contain a resin.

A glass panel unit of one aspect according to the present disclosure is as follows. The glass panel unit includes: a first glass pane including at least a plate glass; a second glass pane including at least a plate glass facing the first glass pane; a frame member which has a frame shape and which the first glass pane and the second glass pane are bound together through; and a spacer disposed between the first glass pane and the second glass pane. A depressurized space is provided between the first glass pane and the second glass pane. The spacer contains a resin. The first glass pane is to be an exterior pane. The second glass pane is to be an interior pane. The first glass pane has ultraviolet transmittance lower than ultraviolet transmittance of the second glass pane.

A glass window of one aspect according to the present disclosure includes the glass panel unit and a window frame disposed at an outer periphery of the glass panel unit.

According to the present disclosure, the first glass pane has lower ultraviolet transmittance than the second glass pane, which enables degradation of the resin contained in the spacer to be suppressed. This enables the depressurized space to stably be maintained.

DESCRIPTION OF EMBODIMENTS

The following embodiments relate to a glass panel unit. More specifically, the following embodiments relate to a glass panel including a pair of glass panes with a depressurized space between the pair of glass panes. Preferable aspects of the glass panel unit will be described below.

First Embodiment

Figure 1A:
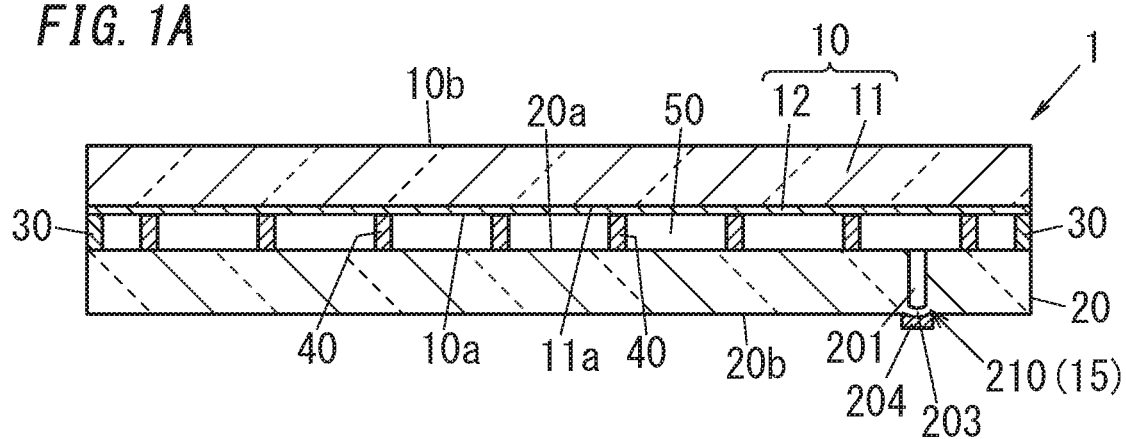
FIG. 1A is a sectional view illustrating a glass panel unit of a first embodiment.
Figure 1B:
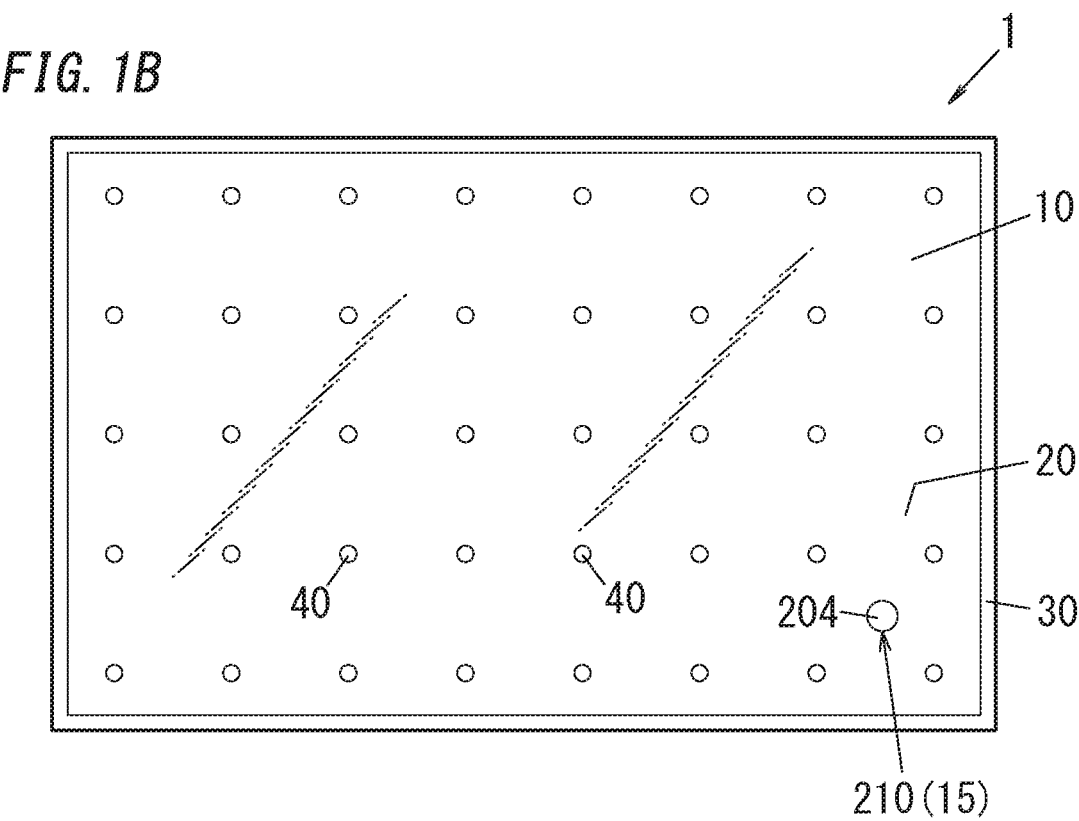
FIG. 1B is a plan view illustrating the glass panel unit of the first embodiment.

FIGS. 1A and 1B illustrate a glass panel unit 1 (referred to as a "vacuum glass panel" when the glass panel unit has a vacuum therein) of a first embodiment. FIG. 1A is a cross-sectional view, and FIG. 1B is a plan view. Note that FIGS. 1A and 1B schematically illustrate the glass panel unit, and the dimensions of respective portions thereof are not necessarily to scale and may be different from actual ones. In particular, in FIG. 1A, the thickness of the glass panel unit is illustrated to be larger than the actual one to facilitate the reader's understanding. In addition, in FIGS. 1A and 1B, the spacers are also illustrated in a larger size than actual ones.

The glass panel unit 1 is basically transparent. Thus, components (such as a frame member 30 and spacers 40) in the glass panel unit 1 are visible. FIG. 1B illustrates such visible internal components. More specifically, FIG. 1B illustrates the glass panel unit 1 seen from a first glass pane 10 thereof.

The glass panel unit 1 includes a first glass pane 10, a second glass pane 20, the frame member 30, and the spacers 40. The first glass pane 10 includes at least a plate glass 11. The second glass pane 20 includes at least a plate glass facing the first glass pane 10. The frame member 30 has a frame shape. The first glass pane 10 and the second glass pane 20 are bound together through the frame member 30. The spacers 40 are disposed between the first glass pane 10 and the second glass pane 20. The glass panel unit 1 includes a depressurized space 50. The depressurized space 50 is provided between the first glass pane 10 and the second glass pane 20. The spacers 40 contain a resin. The first glass pane 10 is to be an exterior pane. The second glass pane 20 is to be an interior pane. That is, when the glass panel unit 1 is installed in a wall or the like, the first glass pane 10 is disposed on an exterior side, and the second glass pane 20 is disposed on an interior side. The first glass pane 10 has an ultraviolet transmittance lower than ultraviolet transmittance of the second glass pane 20.

When in the glass panel unit, the spacers 40 contain a resin, degradation of the spacers 40 may be a problem as described above. However, in the glass panel unit 1 of the present disclosure, the ultraviolet transmittance of the first glass pane 10 to be disposed on the exterior side is lower than the ultraviolet transmittance of the second glass pane 20. Thus, the glass panel unit 1 enables the amount of ultraviolet radiation striking the spacers 40 to be reduced as compared to a case where the first glass pane 10 is disposed on the interior side and the second glass pane 20 is disposed on the exterior side, which enables degradation of the resin contained in the spacers 40 to be suppressed. Suppressing the degradation of the resin enables a reduction of the degree of vacuum (an increase of inner pressure) due to gas which can be generated from the resin to be suppressed. Moreover, suppressing the degradation of the resin enables the strength of the spacers 40 to be maintained over time. Furthermore, suppressing the degradation of the resin suppresses deterioration of the appearance of the glass panel unit due to coloring of the spacers 40. Thus, the depressurized space 50 can be stably maintained.

In the first glass pane 10, a surface facing the second glass pane 20 is defined as a first surface 10a, and a surface opposite to the first surface 10a is defined as a second surface 10b. In the second glass pane 20, a surface facing the first glass pane 10 is defined as a first surface 20a, and a surface opposite to the first surface 20a is defined as a second surface 20b. The first surface 10a of the first glass pane 10 faces the first surface 20a of the second glass pane 20. The second surface 10b of the first glass pane 10 is a surface of the glass panel unit 1 to be disposed on the exterior side. The second surface 20b of the second glass pane 20 is a surface of the glass panel unit 1 to be disposed on the interior side. The thickness of each of the first glass pane 10 and the second glass pane 20 is within a range of, for example, 1 mm to 10 mm.

As shown in FIG. 1B, each of the first glass pane 10 and the second glass pane 20 has a rectangular shape. The glass panel unit 1 is also rectangular. When viewed in plan, the first glass pane 10 and the second glass pane 20 have their outer edges aligned with each other. As used herein, viewing the glass panel unit 1 in plan means viewing the glass panel unit 1 in the thickness direction thereof.

The first glass pane 10 includes the plate glass 11 and a functional film 12. The plate glass 11 is formed of plate-shaped glass. The functional film 12 is a film and may also be referred to as a layer. The first glass pane 10 has a structure in which the functional film 12 is disposed on the plate glass 11. In the first glass pane 10, the plate glass 11 is disposed on the exterior side, and the functional film 12 is disposed on the interior side. The plate glass 11 has a surface which is to be disposed on the interior side, and this surface is defined as an inner surface 11a. The plate glass 11 has a surface which is to be disposed on the exterior side, and this surface corresponds to an exterior-side surface of the first glass pane 10 and is the second surface 10b. The functional film 12 is disposed on the inner surface 11a of the plate glass 11. The functional film 12 is disposed on the entirety of the inner surface 11a. The functional film 12 has a surface which is opposite to the inner surface 11a, and this surface is the first surface 10a of the first glass pane 10. The functional film 12 separates the depressurized space 50 from the plate glass 11, and thus, the depressurized space 50 is not directly in contact with the plate glass 11.

The functional film 12 is a film which hardly transmits ultraviolet radiation. The functional film 12 may include, for example, an ultraviolet reflective film, an ultraviolet absorbing film, or an ultraviolet scattering film. The functional film 12 is transmissive to light in a visible light range and is basically transparent. The functional film 12 may include a light reflecting film, a light absorbing film, a light scattering film, or the like which functionally influence light. In this case, light in the visible light range is hardly transmitted, and consequently, the transmission amount of ultraviolet radiation may also decrease. Alternatively, the functional film 12 may include an infrared reflective film or the like. Also in the case of the infrared reflective film, it is possible to reduce ultraviolet radiation as well as infrared radiation passing through the infrared reflective film. Moreover, when the functional film 12 has an infrared reflective property, infrared radiation can be shielded, and therefore, the thermal insulation property of the glass panel unit 1 is improved. The functional film 12 may be a Low-E film. The term "Low-E" is an abbreviation of Low-emissivity. The functional film 12 preferably has a thermal barrier property. The functional film 12 is formed of, for example, a thin film containing metal. Examples of the thin film containing metal include a metal thin film and a metal oxide thin film. The thin film containing metal can effectively suppress transmission of ultraviolet radiation. Note that the thin film containing metal has a small thickness and transmits light, and has thus almost no influence on the transparency of the glass panel unit 1. Thus, the first glass pane 10 according to a preferred aspect includes plate-shaped glass (i.e., the plate glass 11) and a thin film containing metal (i.e., the functional film 12).

Example of a material for the plate glass 11 include soda-lime glass, high strain-point glass, chemically strengthened glass, no-alkali glass, quartz glass, Neoceram, and physically strengthened glass.

The second glass pane 20 is formed of plate-shaped glass. The plate-shaped glass itself is the second glass pane 20. The second glass pane 20 may be the same as the plate glass 11. For example, the second glass pane 20 and the plate glass 11 may have the same thickness. Moreover or alternatively, the second glass pane 20 and the plate glass 11 may be made of the same material. Naturally, the second glass pane 20 and the plate glass 11 may be different from each other in material, thickness, and the like.

Examples of a material for the second glass pane 20 include soda-lime glass, high strain-point glass, chemically strengthened glass, no-alkali glass, quartz glass, Neoceram, and physically strengthened glass.

Note that the second glass pane 20 may include a functional film in addition to the plate-shaped glass. In this case, the second glass pane 20 includes the plate glass and the functional film. The functional film may be disposed on a surface corresponding to the first surface 20a of the second glass pane 20. The functional film may have a similar configuration to the functional film 12. Moreover, the plate glass may have a similar configuration to the plate glass 11. Note that the first glass pane 10 and the second glass pane 20 have different ultraviolet transmittances and thus do not have exactly the same configuration.

The depressurized space 50 is hermetically sealed with the first glass pane 10, the second glass pane 20, and the frame member 30. The frame member 30 serves as a sealer. Air pressure in the depressurized space 50 is lower than atmospheric pressure. When the air pressure in the depressurized space 50 is, for example, 0.01 Pa or lower, the depressurized space 50 is a vacuum space. The depressurized space 50 is formed through evacuation. The depressurized space 50 has a thickness of, for example, 10 μm to 1000 μm.

Optionally, the glass panel unit 1 may have a gas adsorbent material in the depressurized space 50. The gas adsorbent material may include a getter. The gas adsorbent material adsorbs the gas in the depressurized space 50, thus maintaining a reduced pressure state in the depressurized space 50 and improving the thermal insulation properties. The gas adsorbent material may be provided to any of the first surface 10a of the first glass pane 10, the first surface 20a of the second glass pane 20, a side of the frame member 30, or the inside of the spacers 40.

The frame member 30 is made of a glass adhesive. The glass adhesive includes hot melt glass. The hot melt glass is also called "low-melting glass." The glass adhesive may be glass frit including hot melt glass. Examples of the glass frit include bismuth-based glass frit (i.e., glass frit including bismuth), lead-based glass frit (i.e., glass frit including lead), and vanadium-based glass frit (i.e., glass frit including vanadium). These are examples of low-melting glass. Adopting the low-melting glass enables a reduction in thermal damage to be done on the spacers 40 during manufacturing of the glass panel unit 1.

The frame member 30 is placed on the outer edge of the glass panel unit 1. That is to say, the first glass pane 10 and the second glass pane 20 are bound together through the frame member 30. The frame member 30 creates a space between the first glass pane 10 and the second glass pane 20. The frame member 30 binds the first glass pane 10 and the second glass pane 20 together so that binding is achieved at the outer edge of the glass panel unit 1.

The glass panel unit 1 includes a plurality of spacers 40. Those spacers 40 maintain a gap between the first glass pane 10 and the second glass pane 20, thus creating the depressurized space 50 easily.

The spacers 40 are arranged in the depressurized space 50. The spacers 40 are in contact with the first glass pane 10 and specifically, with the functional film 12. The spacers 40 are also in contact with the second glass pane 20. In this embodiment, the spacers 40 are columnar. The spacers 40 may have a diameter of 0.1 mm to 10 mm, for example. The smaller the diameter of the spacers 40 is, the less perceivable the spacers 40 will be. On the other hand, the larger the diameter of the spacers 40 is, the stronger the spacers 40 will be. The spacers 40 may have a height of 10 μm to 1000 μm, for example. The height of the spacers 40 defines the gap between the first glass pane 10 and the second glass pane 20, i.e., the thickness of the depressurized space 50.

Those spacers 40 are arranged at respective intersections of a virtual grid of a figure with four sides and four right angles (see FIG. 1B). Those spacers 40 are arranged in a dot pattern at regular intervals. The spacers 40 may be arranged at a pitch of 10 mm to 100 mm, for example. Specifically, this pitch may be 20 mm. The shapes, sizes, number, pitch, and arrangement pattern of the spacers 40 are not particularly limited to this example but may be selected appropriately. For example, the spacers 40 may have prismatic shapes or spherical shapes.

In the glass panel unit 1, spacers 40 made of a resin are employed. The spacers 40 contain the resin. The spacers 40 may be formed of a resin molded product. The entirety of each spacer 40 is preferably made of the resin.

The spacers 40 preferably contain polyimide. Adopting polyimide makes the spacers 40 highly heat-resistant and mechanically strong. The spacers 40 made of a resin receive pressure from the two glass panes, and thus, the spacers 40 tend to be expanded and increased in size due to compression. However, since the polyimide is rugged, the amount of the increase in size is smaller than that of the other resins, so that the spacers 40 are less perceivable. Moreover, adopting polyimide with low light absorption improves the transparency of the spacers 40, and therefore, even when the spacers 40 are pressed and increased in size, the spacers 40 are hardly perceivable.

In the known art, a metal has generally been used as a material for spacers of a glass panel unit. However, a metal has too high thermal conductivity to achieve thermal insulation advantageously. In addition, a metal has too poor elasticity to absorb impact effectively, thus making the glass panel unit more vulnerable to impact. Glass or a ceramic could be used as a material for the spacers. In that case, however, the strength would tend to decrease. In the glass panel unit of the present disclosure, spacers are made of a resin. This enables thermal conduction through the spacers to be suppressed and also enables impact to be absorbed. Therefore, it is possible to obtain a glass panel unit having excellent thermal insulation and strength. In particular, when the resin included in the spacers contains polyimide, it is possible to obtain a glass panel unit having high strength and an excellent appearance.

In this embodiment, the spacers 40 are preferably formed of a film. The film is made of a resin. In this case, the spacers 40 preferably include at least one polyimide film. The spacers 40 more preferably include a stack of polyimide films. That is, the spacers 40 may be formed of at least one polyimide film. Adopting the polyimide film facilitates formation of the spacers 40. The polyimide film is cut into pieces having the shape of the spacers 40, and the pieces are used as the spacers 40. When each spacer 40 is a stack, the stack as the spacer 40 may be a stack of two or more polyimide films or a stack of a polyimide film and another substance. The spacers 40 may be obtained by punching a film in a prescribed size. The resin film may be a resin sheet. That is, the polyimide film may be a polyimide sheet.

The spacers 40 may be formed of a transparent polyimide film. The transparent polyimide film is a film made of polyimide and having transparency as described above. Examples of the polyimide films include "Neopulim" manufactured by MITSUBISHI GAS CHEMICAL COMPANY, INC. and "TORMED" manufactured by I.S.T Corporation. Note that the spacers 40 are not limited to the film. For example, the spacers 40 may be formed through, for example, application and curing of a resin.

The resin contained in the spacers 40 may include an imide group. Moreover, the resin contained in the spacers 40 may contain a benzene ring. The imide group and the benzene ring are advantageous to form satisfactory spacers 40. Note that the imide group and the benzene ring may involve a problem of deterioration due to ultraviolet radiation. The glass panel unit 1 of the present disclosure is structured such that the amount of ultraviolet radiation striking the resin is reduced. Thus, degradation of the resin due to the imide group and the benzene ring is effectively suppressible.

The glass panel unit 1 is installed such that the first glass pane 10 is disposed on the exterior side and the second glass pane 20 is disposed on the interior side. The first glass pane 10 is a glass pane to be an exterior pane. The second glass pane 20 is a glass pane to be an interior pane. When the glass panel unit 1 is applied, for example, to a building, the glass panel unit 1 is disposed such that the first glass pane 10 is located closer to the exterior than the second glass pane 20 is, and the second glass pane 20 is located closer to the interior than the first glass pane 10 is. Thus, the glass panel unit 1 may be disposed such that the first glass pane 10 is on the outer side of an object to which the glass panel unit 1 is attached, and the second glass pane 20 is on the inner side of the object. The glass panel unit 1 may be used in, for example, windows, partitions, signage panels, showcases (including refrigeration showcases and warming showcases), and vehicles (cars, ships, airplanes, trains, etc.).

The ultraviolet transmittance of the first glass pane 10 is smaller than the ultraviolet transmittance of the second glass pane 20. When the spacers 40 contain a resin, a problem may occur that the resin easily degrades due to exterior ultraviolet radiation. However, in the glass panel unit 1 of the present disclosure, the first glass pane 10 having low ultraviolet transmittance is disposed on the exterior side and is thus more suppressive than the second glass pane 20 disposed on the exterior side with respect to the degradation of the resin. Therefore, it is possible to obtain the glass panel unit 1 having an excellent thermal insulating property, an excellent strength, and an excellent appearance.

Figure 2:
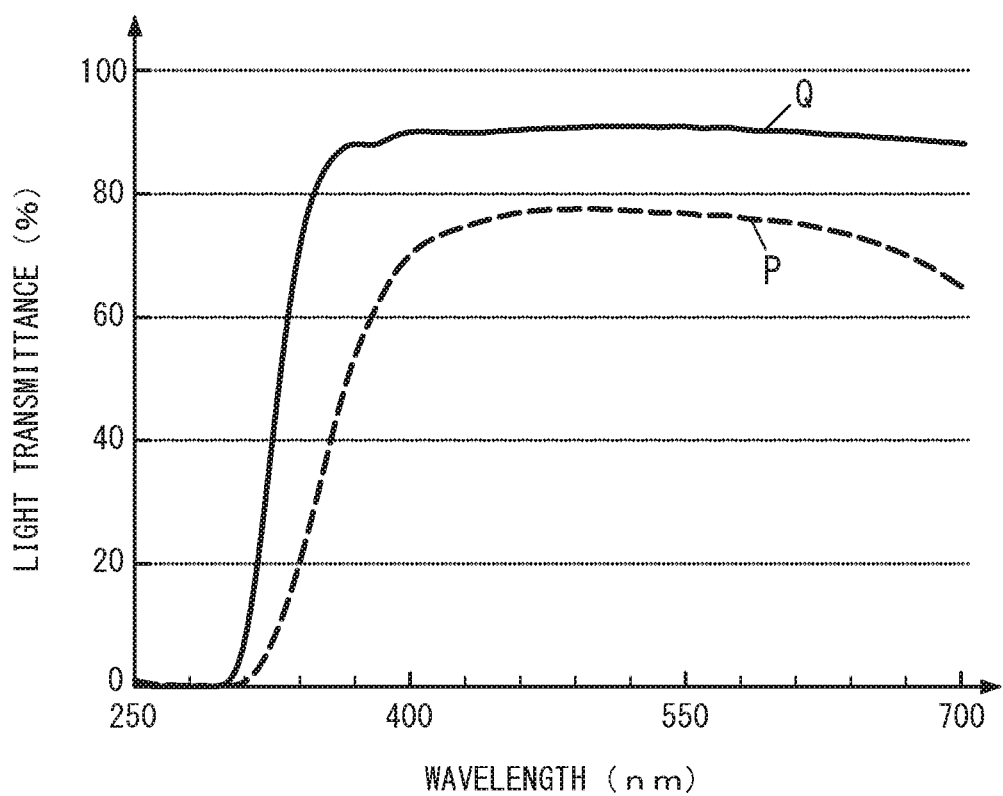
FIG. 2 is a graph illustrating an example of light transmittance of a glass pane.

FIG. 2 is a graph illustrating light transmittance of two types of glass panes. Light mentioned herein includes ultraviolet radiation. The graph in FIG. 2 illustrates transmittance of light in an ultraviolet to visible wavelength range of 250 nm to 700 nm (i.e., electromagnetic wave). In FIG. 2, P represents a glass pane including the above-described functional film (referred to as a glass pane P), and Q represents a glass pane including no functional film (referred to as a glass pane Q). The glass pane Q is a plate glass itself. The glass pane P includes a plate glass which is the same as the glass pane Q and a functional film disposed on the plate glass. The functional film is a thin film containing metal. As illustrated in FIG. 2, when the wavelength is shorter than about 300 nm, the transmittance of the glass pane P and the transmittance of the glass pane Q are not different from each other and are both substantially 0%. However, within an ultraviolet range corresponding to a wavelength range of 300 nm to 400 nm, the glass pane P transmits less ultraviolet radiation than the glass pane Q. The glass pane P may serve as the first glass pane 10, and the glass pane Q may serve as the second glass pane 20. In this case, since the first glass pane 10 transmits less ultraviolet radiation than the second glass pane 20, the amount of ultraviolet radiation striking the spacers 40 is reduced as a result of exterior light (i.e., sunlight) passing through the first glass pane 10. Thus, degradation of the spacers 40 due to the ultraviolet radiation is suppressed.

For the two types of glass panes illustrated in FIG. 2, a difference in degradation of the resin is confirmed in the following experiment. Through the respective glass panes, the resins (polyimide films) were irradiated with ultraviolet radiation in the atmosphere. As a control, a resin was directly irradiated with ultraviolet radiation without the ultraviolet radiation passing through a glass pane. The irradiation amount of the ultraviolet radiation was a one-year equivalent. The decomposition speed of the resin irradiated with the ultraviolet radiation through the glass pane Q was 1.2, and the decomposition speed of the resin directly irradiated with the ultraviolet radiation was 4.3, where the decomposition speed of a resin irradiated with ultraviolet radiation through the glass pane P was 1 defined as a reference. Thus, it was confirmed that the decomposition amount of the resin due to irradiation with the ultraviolet radiation through the glass pane P was smaller by about 20% than the decomposition amount of the resin due to irradiation with the ultraviolet radiation through the glass pane Q. Thus, it was found that disposing the glass pane P, but not the glass pane Q, on a side on which the amount of ultraviolet radiation is much larger, i.e., on the exterior side is effective.

In the present embodiment, the difference between the ultraviolet transmittance of the first glass pane 10 and the ultraviolet transmittance of the second glass pane 20 is caused due to the presence or absence of the functional film 12. As in this case, when the difference in ultraviolet transmittance is caused due to the presence or absence of the functional film 12, it is possible to easily obtain glass panes having different ultraviolet transmittances. The presence or absence of the functional film 12 is an aspect causing a difference in ultraviolet transmittance between glass panes.

The difference between the ultraviolet transmittance of the first glass pane 10 and the ultraviolet transmittance of the second glass pane 20 may be caused due to another aspect other than the presence or absence of the functional film 12 or an aspect added to the functional film 12. For example, when the thickness of the first glass pane 10 is larger than the thickness of the second glass pane 20, light is hardly transmitted through the first glass pane 10, and therefore, the ultraviolet transmittance of the first glass pane 10 may be lower than the ultraviolet transmittance of the second glass pane 20. Alternatively, when a material for glass is changed, and a material which is not easily transmit ultraviolet radiation is employed as the material for the first glass pane 10, the ultraviolet transmittance of the first glass pane 10 may be lower than the ultraviolet transmittance of the second glass pane 20. Moreover, due to a difference between surface profiles of glass (e.g., a rough surface of the first glass pane 10), the ultraviolet transmittance of the first glass pane 10 may be lower than the ultraviolet transmittance of the second glass pane 20. Alternatively, the first glass pane 10 may be formed of patterned glass, ground glass, colored glass, or wire glass, and the second glass pane 20 may be formed of normal glass other than the patterned glass, the ground glass, the colored glass, and the wire glass. Also in these cases, the ultraviolet transmittance of the first glass pane 10 may be lower than the ultraviolet transmittance of the second glass pane 20. Note that the second glass pane 20 may be made of normal soda glass.

The ultraviolet transmittance of the first glass pane 10 is lower than the ultraviolet transmittance of the second glass pane 20 preferably by 10% or more, more preferably by 20% or more. The ultraviolet transmittance in this case is calculated based on a value obtained by integrating the ultraviolet transmittances in a wavelength range of 300 nm to 400 nm.

The glass panel unit 1 preferably includes an identification structure that allows identification of the first glass pane 10 and the second glass pane 20. Providing the identification structure enables a front surface and a back surface of the glass panel unit 1 to be identified. Identifying the front surface and the back surface of the glass panel unit 1 means distinguishing between an exterior-side surface (the second surface 10b) of the glass panel unit 1 and an interior-side surface (the second surface 20b) of the glass panel unit 1. When the glass panel unit 1 is provided with the identification structure that allows identification of the front surface and the back surface, it is possible to easily determine which one of the pair of glass panes is the first glass pane 10, that is, the glass pane to be installed on the exterior side. Thus, it becomes easy to appropriately install the glass panel unit 1, and it is possible to securely suppress the degradation of the resin.

The identification structure is particularly useful when it is difficult to distinguish between the first glass pane 10 and the second glass pane 20 with the naked eye. As described above, the first glass pane 10 and the second glass pane 20 may have a slight difference, for example, the presence or absence of the functional film 12 or the difference in the thickness. Such a difference is identifiable when measured by, for example, various apparatuses but is not easily distinguishable at a glance, and one may mistakenly handle the first glass pane 10 for the second glass pane 20, or vice versa. However, when the glass panel unit 1 is provided with the identification structure that allows identification of the front surface and the back surface, appropriately installing the glass panel unit 1 is further facilitated, and it is possible to securely suppress degradation of the resin.

The identification structure may be disposed on a surface of a glass pane. For example, the identification structure may be provided on the first surface 10a or the second surface 10b of the first glass pane 10, or the identification structure may be provided on the first surface 20a or the second surface 20b of the second glass pane 20. Alternatively, identification structures may be disposed on a plurality of surfaces selected from the surfaces. Since the glass panel unit 1 is transparent, the identification structures are visually perceivable even when the identification structures are disposed on inner surfaces (the first surface 10a and the first surface 20a) of the glass panes. The identification structure may be a mark such as a character, pattern, sign, or diagram. When one surface of each of the two glass panes is provided with a mark, it becomes easy to identify the glass panes. Alternatively, different marks may be provided to the two glass panes. The marks may be formed by an appropriate method, such as printing, surface processing, or as a seal.

Alternatively, the identification structure may be configured as a difference of appearance of the two glass panes. For example, when two glass panes are different from each other in material, dimension, shape (e.g., surface profile), color, thickness, transparency, or light reflectivity, the glass panes are be easily identifiable. Even when the difference in these parameters is small, the difference is confirmable by being measured with an apparatus. However, the identification structure is preferably capable of performing identification without employing the apparatus. Thus, glass panes are easily identifiable. The identification structure is preferably a structure that allows visual identification of the glass panes. When the functional film 12 is colored, the glass pane is easily identifiable by the eye. The identification structure may be a structure that allows identification of the glass pane through haptic sense (i.e., texture). The identification structure may be provided to the entirety of the glass pane or a part of the glass pane.

In the present embodiment, when the depressurized space 50 is formed, an exhaust passage 201 provided to the second glass pane 20 may be used. In FIG. 1A, the exhaust passage 201 is illustrated as a hole. Moreover, a sealing portion 203 closing the exhaust passage 201 and a cap 204 covering the sealing portion 203 are illustrated. The exhaust passage 201 constitutes an exhaust port. The second glass pane 20 has a mark 210 of the exhaust port used for forming the depressurized space 50 (hereinafter referred to as "exhaust port mark 210"). The exhaust port mark 210 includes the exhaust passage 201 and the sealing portion 203. As described later, the glass panel unit 1 is formed through an evacuation process for forming the depressurized space 50, and therefore, the exhaust port mark 210 may remain in the glass pane. The exhaust port mark 210 may usually be provided to any one of the first glass pane 10 and the second glass pane 20. The exhaust port mark 210 includes a deformed part of glass and lacks the integrality with the other parts. Thus, the exhaust port mark 210 is a part whose strength may be low. In this case, when the exhaust port mark 210 is provided to the first glass pane 10, the part whose strength is low is more likely to be influenced by exterior impact because the first glass pane 10 is a glass pane to be disposed on the exterior side. For example, the glass panel disposed on the exterior side is more likely to be exposed to wind and rain, and therefore, when the wind and the rain impinge on the exhaust port mark 210, the glass pane may be broken from the exhaust port mark 210. However, when the exhaust port mark 210 is provided to the second glass pane 20, the exhaust port mark 210 is less likely to be influenced by the exterior impact because the second glass pane 20 is to be disposed on the interior side, and thus, breakage due to the exhaust port mark 210 is less likely to be caused. Thus, the glass panel unit 1 is less likely to be broken, and the glass panel unit 1 can be more stably installed.

Here, when the second glass pane 20 has the exhaust port mark 210 and the first glass pane 10 has no mark of the exhaust port, the exhaust port mark 210 serves as the identification structure that allows identification of the first glass pane 10 and the second glass pane 20. In FIGS. 1A and 1B, the exhaust port mark 210 is formed as an identification structure 15. That is, it is possible to easily specify that a glass pane provided with the exhaust port mark 210 is the second glass pane 20. In the exhaust port mark 210, for example, an outer edge shape of a pore used for evacuation may remain. Moreover, a component such as the cap 204 is perceivable. Thus, the exhaust port mark 210 is easily perceivable by the eye. Moreover, the exhaust port mark 210 is a mark necessarily formed when the evacuation process is employed. Therefore, the exhaust port mark 210 is formed without a step of specially providing an identification structure. Thus, the identification structure 15 can be easily formed. In the present embodiment, the identification structure 15 is provided with, as described later, an exhaust passage 201, the sealing portion 203 sealing the exhaust passage 201, and the cap 204 covering the sealing portion 203 and is thus easily identifiable.

Figure 3:
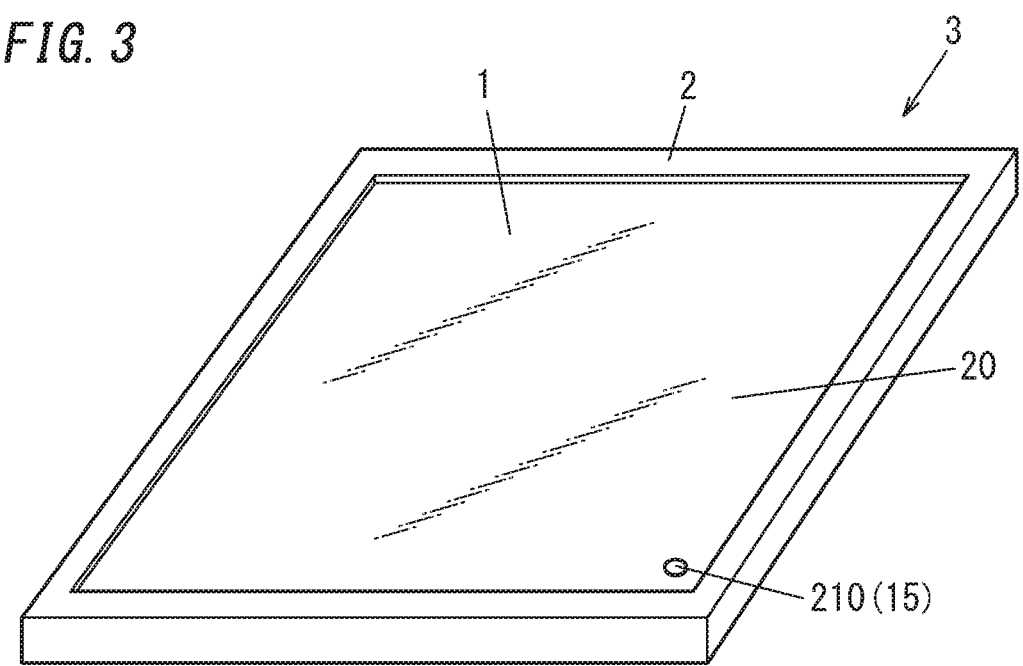
FIG. 3 is a perspective view illustrating an example of a glass window.

FIG. 3 is an example of a glass window (a glass window 3) employing the glass panel unit 1. The glass window 3 includes the glass panel unit 1 and a window frame 2 disposed at an outer periphery of the glass panel unit 1. The glass panel unit 1 has a rectangular (oblong or square) shape, and at the outer periphery of the rectangular shape, the window frame 2 is disposed. The window frame 2 may be made of metal, a resin, or the like. The window frame 2 may be provided with a structure (e.g., projection, hole, guide rail) which enables connection to an attachment object such as a building. The window frame 2 and the glass panel unit 1 are connectable via an appropriate connection structure. For example, the window frame 2 may hold and fix the glass panel unit 1. Moreover, the window frame 2 and the glass panel unit 1 may be bound together by an adhesive. The glass window 3 in FIG. 3 is attachable to, for example, a wall of a building. When the glass panel unit 1 is provided with the identification structure 15 (the exhaust port mark 210), the identification structure 15 is preferably disposed at a location where the identification structure 15 is visible. For example, the identification structure 15 is disposed at a location where the identification structure 15 does not overlap the window frame 2. The window frame 2 is disposed not to cover the identification structure 15. Note that in the case of an identification structure such as the exhaust port mark 210 (the identification structure 15) which imparts no decorativeness to the glass panel unit 1, the identification structure is preferably disposed at a corner of the glass panel unit 1 so that the identification structure is not perceivable. In FIG. 3, the exhaust port mark 210 (the identification structure 15) is disposed at a corner of the glass window 3.

Figure 4:
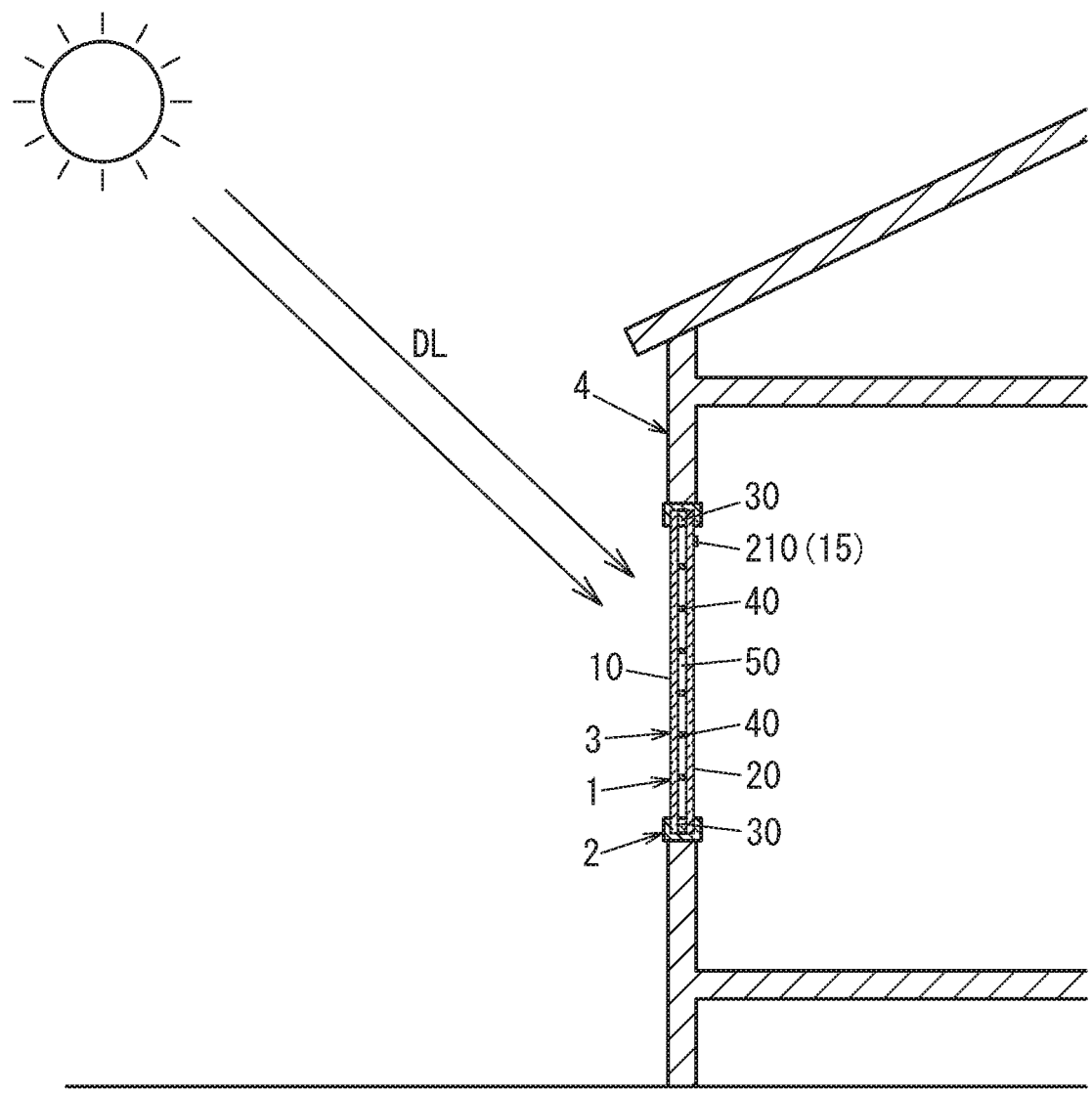
FIG. 4 is a view schematically illustrating an example in which the glass window is applied to a building.

FIG. 4 is an example illustrating the glass window 3 applied to a building 4. The glass window 3 includes the glass panel unit 1 and the window frame 2. The glass window 3 is disposed upright so that the depressurized space 50 extends in the vertical direction. In the glass panel unit 1, the first glass pane 10 is disposed on the exterior side, and the second glass pane 20 is disposed on the interior side. As illustrated in FIG. 4, in the glass window 3, sunlight DL passes through the first glass pane 10 with low ultraviolet transmittance and then strikes the spacers 40. This effectively suppresses degradation of the spacers 40 due to ultraviolet radiation.

An exemplary manufacturing process of the glass panel unit 1 will be described below.

Figure 5A:
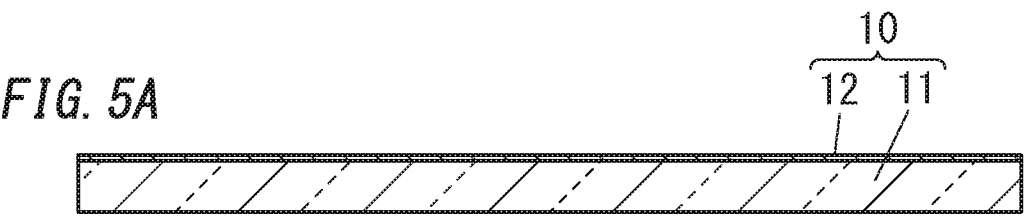
FIGS. 5A, 5B, and 5C are sectional views illustrating the glass panel unit of the first embodiment in steps in which the glass panel unit is being formed.
Figure 5B:
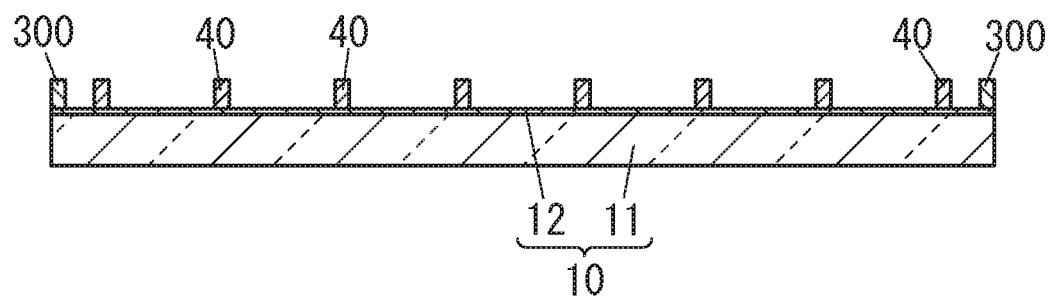
Figure 5C:
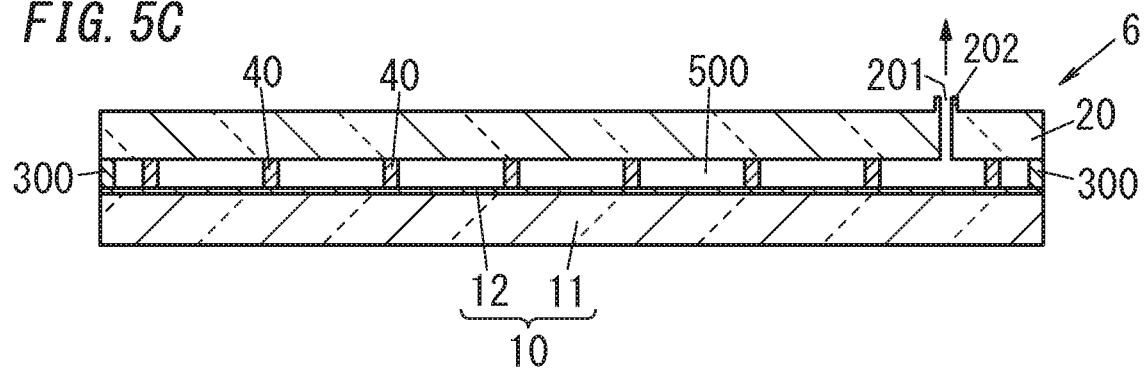

FIGS. 5A to 5C show the exemplary manufacturing process of the glass panel unit 1. FIGS. 5A to 5C are sectional views. The glass panel unit 1 of FIGS. 1A and 1B is manufactured by a method illustrated in FIGS. 5A to 5C. Note that in FIGS. 5A to 5C, the components of the glass panel unit in FIG. 1A are illustrated upside down (that is, FIGS. 5A to 5C are drawn such that the first glass pane 10 is located under the second glass pane 20).

At the beginning of manufacturing of the glass panel unit 1, first of all, the first glass pane 10 and the second glass pane 20 are provided. The first glass pane 10 provided is shown in FIG. 5A. The first glass pane 10 includes the plate glass 11 and the functional film 12 provided on a surface of the plate glass 11. Providing the first glass pane 10 includes providing a first glass pane 10 having a prescribed size.

Although only the first glass pane 10 is illustrated in FIG. 5A, the second glass pane 20 is also provided separately. Providing the second glass pane 20 includes providing the second glass pane 20 having a prescribed size so that the second glass pane 20 is paired with the first glass pane 10. The second glass pane 20 (which has already been stacked over the first glass pane 10) is shown in FIG. 5C. The second glass pane 20 includes the exhaust passage 201. The exhaust passage 201 is formed of a pore penetrating through the second glass pane 20, and an outlet of the pore serves as an exhaust port. The second glass pane 20 includes an exhaust pipe 202, and a pore in the exhaust pipe 202 serves as the exhaust passage 201. The exhaust pipe 202 is disposed on an outer side of the exhaust passage 201. Providing the second glass pane 20 may include providing the exhaust passage 201 and the exhaust pipe 202 to the second glass pane 20.

Next, as shown in FIG. 5B, a glass adhesive 300 and the spacers 40 are disposed on the first glass pane 10. The spacers 40 may be arranged along with the glass adhesive 300 being disposed. The glass adhesive 300 includes hot melt glass. The glass adhesive 300 is disposed in the shape of a frame along the outer edge of the first glass pane 10. The glass adhesive 300 will ultimately form the frame member 30.

After the glass adhesive 300 has been disposed, pre-sintering may be performed. The pre-sintering causes pieces of the glass frit included in the glass adhesive 300 to be integrated. The pre-sintering reduces the incidences of unintentionally and carelessly scattering the glass adhesive 300. Optionally, during the pre-sintering, the glass adhesive 300 may be fixed onto the first glass pane 10. The pre-sintering may be carried out by heating the glass adhesive 300 to a temperature lower than the melting temperature thereof.

The spacers 40 are suitably arranged after the glass adhesive 300 has been disposed. This facilitates the arrangement of the spacers 40. The spacers 40 may be arranged at regular intervals. Alternatively, the spacers 40 may also be dispersed irregularly. When the spacers 40 are formed of a film, the film is punched in a prescribed size in advance. The spacers 40 may be arranged with a chip mounter, for example. Note that the spacers 40 may also be formed by a thin film formation technique instead.

In FIG. 5B, the glass adhesive 300 is disposed on the first glass pane 10. However, the glass adhesive 300 may also be disposed in any appropriate way. For example, the glass adhesive 300 may be disposed on the second glass pane 20. Alternatively, after the first glass pane 10 and the second glass pane 20 have been arranged to face each other, the glass adhesive 300 may be injected into the gap between the first glass pane 10 and the second glass pane 20.

The gas adsorbent may be disposed on one or both of the first glass pane 10 and the second glass pane 20. The gas adsorbent may be provided through adhesion of a solid gas adsorbent or application and drying of a gas adsorbent material with fluidity.

Next, as shown in FIG. 5C, the second glass pane 20 is mounted on the glass adhesive 300 so as to face the first glass pane 10. This forms a composite (referred to as a glass composite 6) including the first glass pane 10, the second glass pane 20, the glass adhesive 300, and the spacers 40. The glass composite 6 has an inner space 500 between the first glass pane 10 and the second glass pane 20. The inner space 500 is surrounded by the glass adhesive 300.

Then, the glass composite 6 is heated. The glass composite 6 may be heated in a heating furnace. Heating causes a rise in the temperature of the glass composite 6. Heating the glass adhesive 300 to a melting temperature melts the glass in the glass adhesive 300, thus allowing the glass adhesive 300 to express adhesiveness. The glass adhesive 300 has a melting temperature higher than 300° C., for example. The melting temperature of the glass adhesive 300 may be higher than 400° C. Nevertheless, the lower the melting temperature of the glass adhesive is, the more advantageous it is to perform the process smoothly. For this reason, the melting temperature of the glass adhesive 300 is suitably at most equal to or lower than 400° C., more suitably 360° C. or lower, much more suitably 330° C. or lower, so much more suitably 300° C. or lower.

In this embodiment, the glass adhesive 300 may melt to the point that softening of the hot melt glass under the heat allows the glass adhesive 300 to be deformed or exhibit binding ability. In that case, the glass adhesive 300 does not have to exhibit such a degree of meltability that causes the glass adhesive 300 to flow out.

When the glass adhesive 300 is heated and melted, the glass adhesive 300 binds the first glass pane 10 and the second glass pane 20 together, thereby hermetically sealing the inner space 500. After the inner space 500 has hermetically been sealed, evacuation is started to discharge gas from the inner space 500. The evacuation may be performed after the temperature in the heating furnace has been reduced to a temperature lower than the melting temperature of the glass adhesive 300. Note that the evacuation may be started before the temperature in the heating furnace reaches the melting temperature of the glass adhesive 300 unless the glass composite 6 is deformed.

The evacuation may be performed with a vacuum pump connected to the exhaust passage 201. In this case, the exhaust pipe 202 may be connected to a pipe extending from the vacuum pump. The evacuation reduces the pressure in the inner space 500 to create a reduced pressure state. Note that such an evacuation of the exemplary manufacturing process is only an example. That is to say, the evacuation step may be performed by a different evacuation method. For example, the glass composite 6 may be disposed in its entirety in a reduced pressure chamber such that the entire glass composite 6 is subjected to the evacuation. In FIG. 5C, the direction in which the gas in the inner space 500 is discharged is indicated by the upward arrow. The air in the inner space 500 is discharged through the exhaust passage 201. This creates the reduced pressure state in the inner space 500.

Next, while the reduced pressure state in the inner space 500 is maintained, the exhaust passage 201 is sealed. The exhaust passage 201 may be sealed by the sealing portion 203 (see FIG. 1A). Sealing the exhaust passage 201 forms the exhaust port mark 210. The sealing portion 203 may be formed of the exhaust pipe 202. The sealing portion 203 may be formed, for example, through heat welding of glass included in the exhaust pipe 202. When the exhaust pipe 202 is thermally melted and is deformed, the exhaust pipe 202 forms the sealing portion 203 closing the exhaust passage 201. Another material for the sealing portion 203 may, of course, be filled. In this case, the material for the sealing portion 203 is preferably glass.

After the depressurized space 50 has been created, the glass composite 6 is cooled. Also, after the depressurized space 50 has been created, the evacuation is stopped. Since the depressurized space 50 is hermetically closed by being sealed with the sealing portion 203, the reduced pressure state is maintained even though the evacuation is no longer performed.

A cap 204 may be arranged outside the sealing portion 203 (see FIG. 1A). The cap 204 covers the sealing portion 203. Covering the sealing portion 203 with the cap 204 improves a sealing property of the exhaust passage 201. Moreover, the cap 204 suppresses breakage at the exhaust port mark 210. Moreover, the cap 204 enables the appearance of the glass panel unit 1 to be improved. The glass panel unit 1 illustrated in FIGS. 1A and 1B is thus manufactured.

Second Embodiment

Figure 6A:
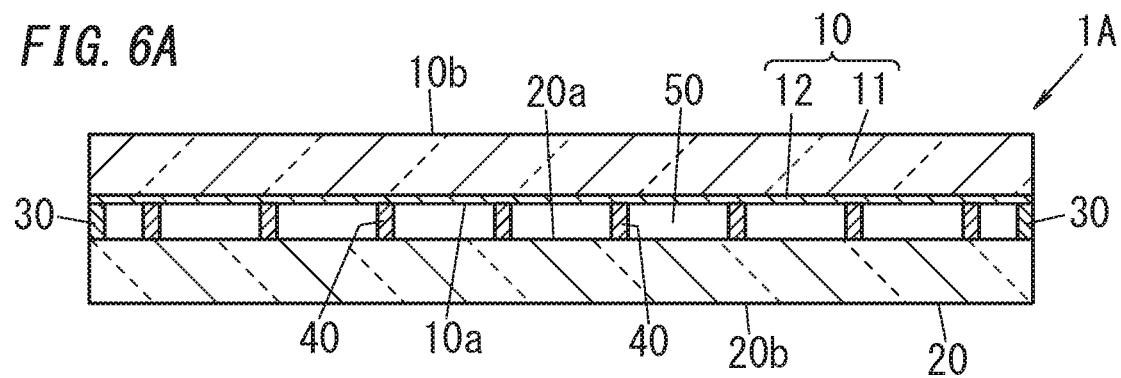
FIG. 6A is a sectional view illustrating a glass panel unit of a second embodiment.
Figure 6B:
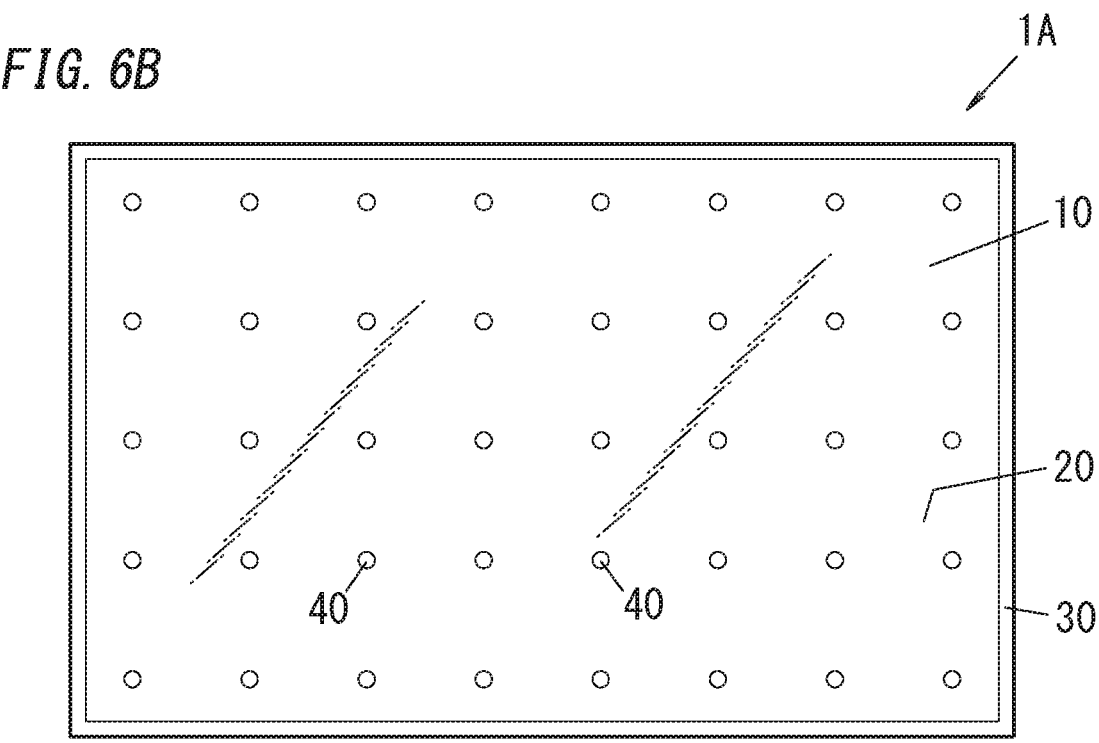
FIG. 6B is a plan view illustrating the glass panel unit of the second embodiment.

FIGS. 6A and 6B show a glass panel unit (a glass panel unit 1A) of a second embodiment. FIG. 6A is a sectional view, and FIG. 6B is a plan view. FIGS. 6A and 6B schematically illustrate the glass panel unit, and similarly to FIGS. 1A and 1B, the dimensions of respective portions thereof are not necessarily to scale and may be different from actual ones The glass panel unit 1A of the second embodiment is different from that of the first embodiment in that the exhaust port mark 210 is not provided. Other components of the second embodiment may be the same as those of the first embodiment. When the exhaust port mark 210 is not provided, the appearance of the glass panel unit 1A is improved. Moreover, when the exhaust port mark 210 is not provided, breakage due to the exhaust port mark 210 is suppressed and the durability of the glass panel unit 1A can be improved. Note that in the second embodiment, if an identification structure is provided, the identification structure may have any of the configurations other than the exhaust port mark 210. Specific examples of the identification structure other than the exhaust port mark 210 have been described in the first embodiment.

Figure 7A:
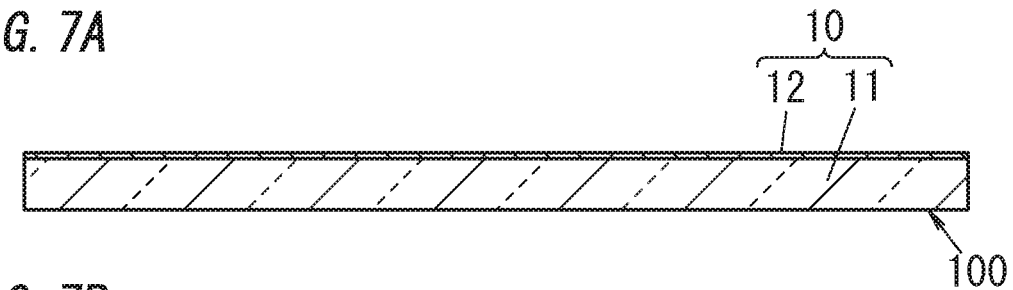
FIGS. 7A, 7B, 7C, and 7D are sectional views illustrating the glass panel unit of the second embodiment in steps in which the glass panel unit is being formed.
Figure 7B:
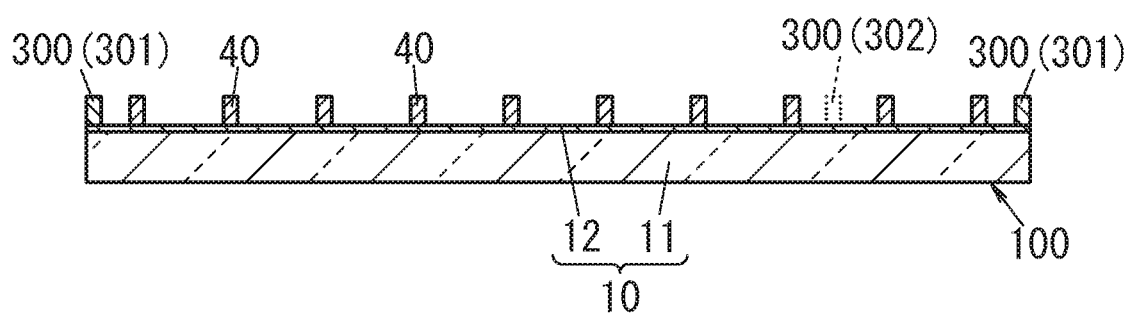
Figure 7C:
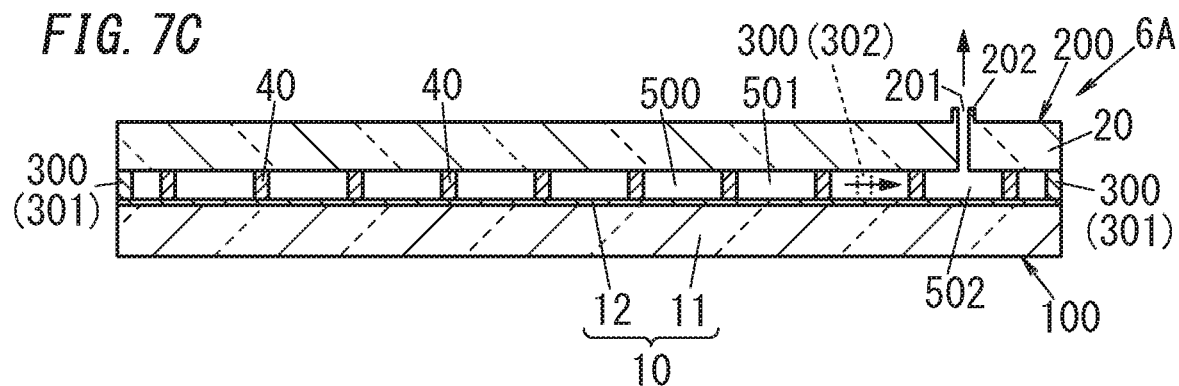
Figure 7D:
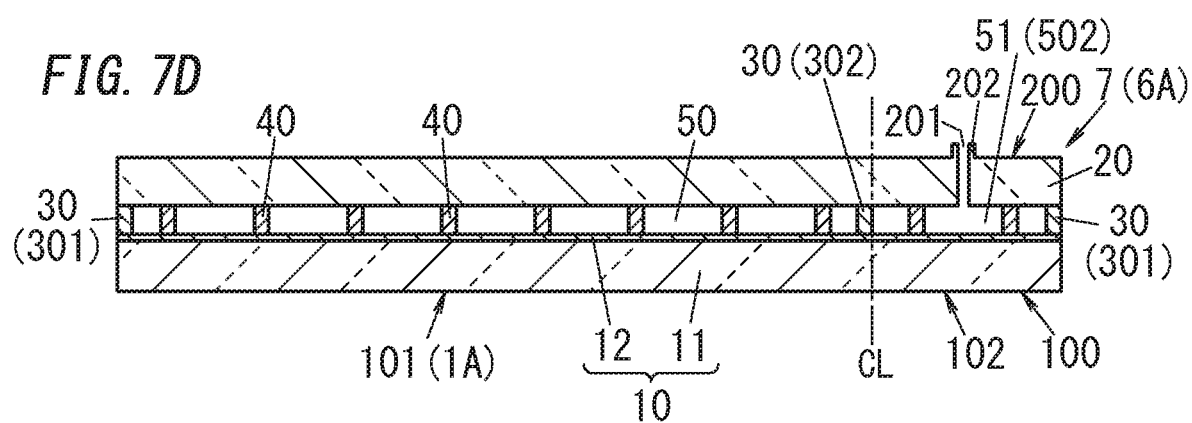
Figure 8A:
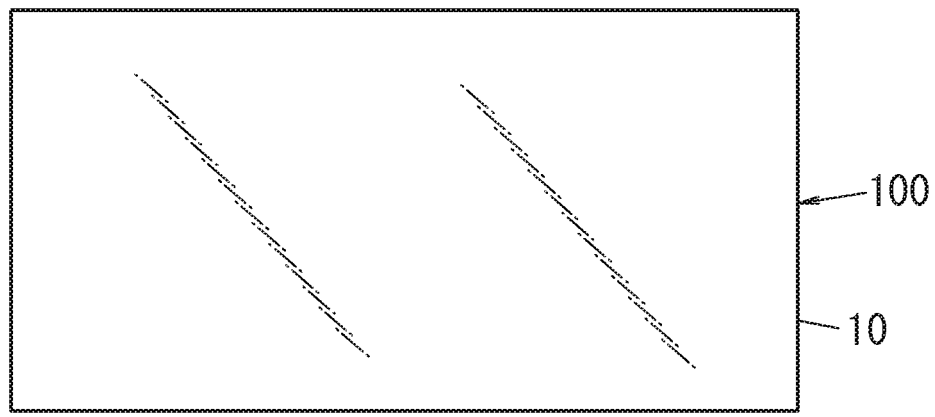
FIGS. 8A, 8B, and 8C are plan views illustrating the glass panel unit of the second embodiment in steps in which the glass panel unit is being formed.
Figure 8B:
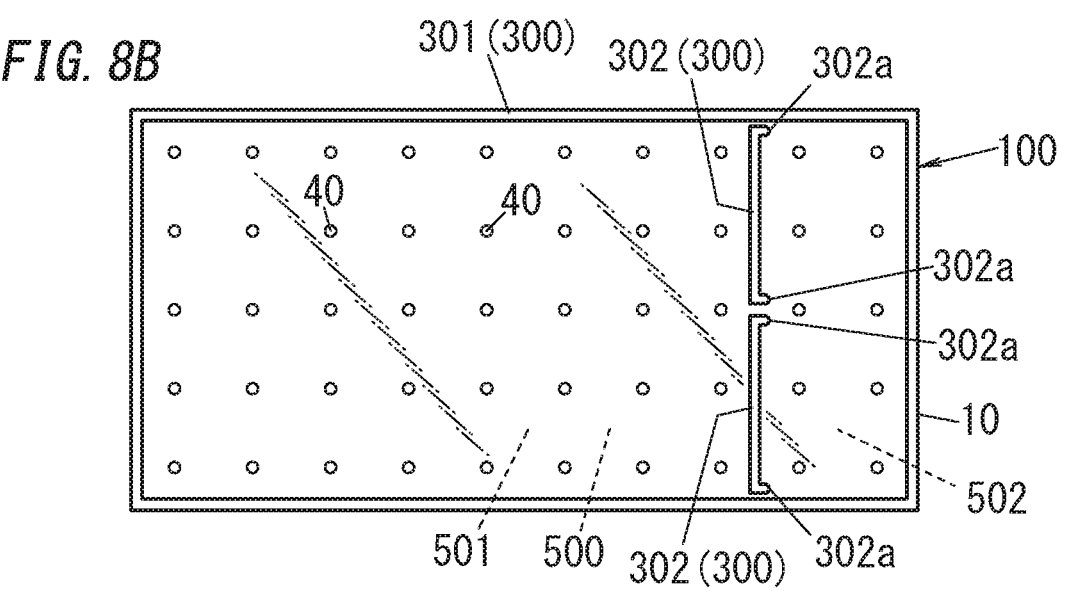
Figure 8C:
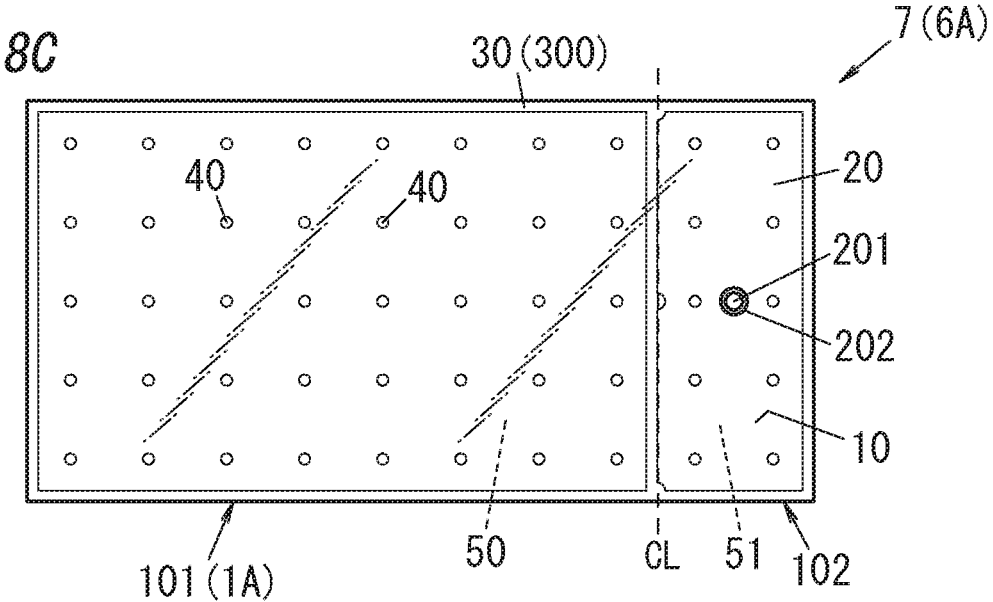

FIGS. 7A to 7D and FIGS. 8A to 8C show an exemplary manufacturing process of the glass panel unit 1A according to the second embodiment. FIGS. 7A to 7D are sectional views. FIGS. 8A to 8C are plan views. In FIG. 8C, inside components are illustrated in a manner similar to FIG. 1B. The glass panel unit 1A of FIGS. 6A to 6B is manufactured by a method illustrated in FIGS. 7A to 8C. Note that in FIGS. 7A to 7D, the components of the glass panel unit in FIG. 6A is illustrated upside down (that is, FIGS. 7A to 7D are drawn such that a first glass pane 10 is located under a second glass pane 20).

At the beginning of manufacturing of the glass panel unit 1A, first of all, a first glass body 100 and a second glass body 200 are provided. The first glass body 100 is a material for the first glass pane 10. The second glass body 200 is a material for the second glass pane 20. The first glass body 100 provided is shown in FIGS. 7A and 8A. The first glass body 100 includes a plate glass 11 and a functional film 12 provided on a surface of the plate glass 11. Providing the first glass body 100 may include processing the first glass body 100 to have a prescribed size.

Although only the first glass body 100 is illustrated in FIGS. 7A and 8A, the second glass body 200 is also provided separately. Providing the second glass body 200 includes providing the second glass body 200 having a prescribed size so that the second glass body 200 is paired with the first glass body 100. The second glass body 200 (which has already been stacked over the first glass body 100) is shown in FIG. 7C. The second glass body 200 includes an exhaust passage 201 and an exhaust pipe 202.

Speaking of the panel size, the size of the first glass body 100, and the second glass body 200 provided at the beginning of the manufacturing is set to be larger than the size of the first glass pane 10 and the second glass pane 20 of the glass panel unit 1A as a final product. In the exemplary manufacturing process, the first glass body 100 and the second glass body 200 are partially removed ultimately. Each of the first glass body 100 and the second glass body 200 for use in the manufacturing process includes a portion to be the glass panel unit 1A and a portion to be removed ultimately.

Next, as shown in FIGS. 7B and 8B, a glass adhesive 300 and spacers 40 are disposed. The spacers 40 may be arranged along with the glass adhesive 300 being disposed. The glass adhesive 300 includes hot melt glass. The glass adhesive 300 is disposed in the shape of a frame. The glass adhesive 300 will ultimately form a frame member 30.

In the exemplary manufacturing process, the glass adhesive 300 includes at least two types of glass adhesives, namely, a first glass adhesive 301 and a second glass adhesive 302. The first glass adhesive 301 and the second glass adhesive 302 are disposed at respectively predetermined locations. In FIG. 7B, the second glass adhesive 302 is indicated by the dotted rectangle. This means that the second glass adhesive 302 is disposed only discontinuously in a straight line parallel to the shorter sides of the first glass body 100. The relative arrangement of the first glass adhesive 301 and the second glass adhesive 302 is understandable from FIG. 8B.

After the first glass adhesive 301 and the second glass adhesive 302 have been disposed, pre-sintering may be performed. The pre-sintering causes pieces of the glass frit included in the first glass adhesive 301 to be integrated and pieces of the glass frit included in the second glass adhesive 302 to be integrated. Nevertheless, the first glass adhesive 301 and the second glass adhesive 302 are out of contact with each other. The pre-sintering decreases the incidences of unintentionally and carelessly scattering the glass adhesive 300. Moreover, a gas adsorbent may be disposed on one or both of the first glass body 100 and the second glass body 200.

As shown in FIG. 8B, the first glass adhesive 301 is disposed along the outer edge of the first body 100. The first glass adhesive 301 is formed, on the first glass body 100, in the shape of a continuous frame that makes one round of the first body 100. The second glass adhesive 302 is provided so as to be located at an end of the glass panel unit 1A as a final product. The second glass adhesive 302 is disposed to be surrounded with, and located inside, the first glass adhesive 301.

In FIG. 8B, two pieces of the second glass adhesive 302 are arranged in line parallel to the shorter sides of the glass panel unit 1A. The number of pieces of the second glass adhesive 302 may also be one or three or more. Those pieces of the second glass adhesive 302 are arranged to form a wall. When the second glass body 200 is laid upon the first glass body 100 as shown in FIGS. 7C and 8B, an inner space 500 is formed between the first glass body 100 and the second glass body 200. The second glass adhesive 302 partitions the inner space 500 into two spaces. Note that the second glass adhesive 302 does not completely partition the inner space 500 into the two spaces but is disposed such that those two spaces in the inner space 500 communicate with each other. Of these two partitioned spaces of the inner space 500, the space located more distant from the exhaust passage 201 is defined herein to be a first space 501, while the space located closer to the exhaust passage 201 is defined herein to be a second space 502. The exhaust passage 201 is provided in the second space 502 (see FIG. 7C). The gaps between the first glass adhesive 301 and the second glass adhesive 302 and the gap between the two pieces of the second glass adhesive 302 serve as air passages during evacuation. In an evacuation step, air is discharged from the first space 501 through the air passages.

Next, as shown in FIG. 7C, the second glass body 200 is mounted on the glass adhesive 300 so as to face the first glass body 100. Thus, a glass composite 6A including the first glass body 100, the second glass body 200, the glass adhesive 300, and the spacers 40 is formed. The glass composite 6A has the inner space 500 between the first glass body 100 and the second glass body 200. In FIG. 7C, the second glass adhesive 302 is indicated by the dotted rectangle. The second glass adhesive 302 does not completely partition the inner space 500.

Then, the glass composite 6A is heated. Heating the glass adhesive 300 to a melting temperature melts the glass in the glass adhesive 300, thus allowing the glass adhesive 300 to express adhesiveness. The heating step is suitably performed in two or more stages. For example, the heating may be carried out such that the temperature of the glass composite 6A is raised through a first stage of heating to a predetermined temperature, which will be maintained for a while and then will be further raised to another predetermined temperature through a second stage of heating. The first stage of heating is defined herein to be a "first heating step". The second stage of heating is defined herein to be a "second heating step".

In the exemplary manufacturing process, the first glass adhesive 301 melts at a lower temperature than the second glass adhesive 302. In other words, the first glass adhesive 301 melts earlier than the second glass adhesive 302. In the first heating step, the first glass adhesive 301 does melt, but the second glass adhesive 302 does not. Melting of the first glass adhesive 301 allows the first glass adhesive 301 to bind the first glass body 100 and the second glass body 200 together, thus sealing the inner space 500 hermetically. The temperature at which the first glass adhesive 301 melts but the second glass adhesive 302 does not melt is defined herein to be a first melting temperature. Since the second glass adhesive 302 does not melt at the first melting temperature, the second glass adhesive 302 maintains its shape.

After the temperature has reached the first melting temperature, the evacuation is started to discharge the gas from the inner space 500. The evacuation may be performed after the temperature in the heating furnace has been reduced to a temperature lower than the first melting temperature. Note that the evacuation may be started before the temperature in the heating furnace reaches the first melting temperature unless the glass composite 6A is deformed.

The evacuation may be performed with a vacuum pump connected to the exhaust passage 201. In this case, the exhaust pipe 202 may be connected to a pipe extending from the vacuum pump. The evacuation reduces the pressure in the inner space 500 to create a reduced pressure state.

In FIG. 7C, the direction in which the gas in the inner space 500 is discharged is indicated by the upward arrow. In addition, in FIG. 7C, the direction in which the gas flows from the first space 501 to the second space 502 is indicated by the rightward arrow. Since the second glass adhesive 302 is disposed to provide air passages as described above, the air passes through those air passages to be discharged through the exhaust passage 201. This creates a reduced pressure state in the inner space 500 including the first space 501 and the second space 502.

After the degree of air pressure in the inner space 500 has reached a predetermined value, the glass composite 6A is heated to a higher temperature (i.e., the second heating step is performed). The heating temperature is raised with the evacuation continued. Raising the heating temperature allows the temperature to reach a second melting temperature, which is higher than the first melting temperature. The second melting temperature may be higher than the first melting temperature by 10° C. to 100° C., for example.

At the second melting temperature, the second glass adhesive 302 melts. This allows the second glass adhesive 302 melted to bind the first glass body 100 and the second glass body 200 together at the location where the second glass adhesive 302 is disposed. In addition, the second glass adhesive 302 softens due to its meltability. Furthermore, the second glass adhesive 302 softened may be deformed to close the air passages. Each piece of the second glass adhesive 302 has a pair of closing portions 302a at both ends thereof (see FIG. 8B). Such closing portions 302a each have a larger amount of the second glass adhesive 302 so as to easily close the air passage. Deforming the closing portions 302a closes the air passages described above.

FIGS. 7D and 8C illustrate how the glass composite 6A looks after the air passages have been closed. The glass composite 6A becomes integrated due to the adhesion action of the glass adhesive 300. The glass composite 6A, which is thus in the integrated state, serves as a panel as an intermediate product (hereinafter defined as an "integrated panel 7").

A depressurized space 50 is formed by splitting the inner space 500 into the depressurized space 50 located more distant from the exhaust passage 201 and an evacuation space 51 located closer to the exhaust passage 201. Deformation of the second glass adhesive 302 creates the depressurized space 50. The depressurized space 50 is formed of the first space 501. The evacuation space 51 is formed of the second space 502. The depressurized space 50 and the evacuation space 51 do not communicate with each other. The depressurized space 50 is hermetically closed with the first glass adhesive 301 and the second glass adhesive 302.

In the integrated panel 7, the first glass adhesive 301 and the second glass adhesive 302 are integrated together to form the frame member 30. The frame member 30 surrounds the depressurized space 50. The frame member 30 also surrounds the evacuation space 51. The first glass adhesive 301 forms part of the frame member 30, and the second glass adhesive 302 forms another part of the frame member 30.

After the depressurized space 50 has been created, the integrated panel 7 is cooled. Also, after the depressurized space 50 has been created, the evacuation is stopped. Hermetically closing the depressurized space 50 allows the depressurized space 50 to be maintained even though the evacuation is no longer performed. In any case, the evacuation is stopped for safety after the integrated panel 7 has been cooled. Optionally, the evacuation space 51 may recover the ordinary pressure since the evacuation is no longer performed.

Finally, the integrated panel 7 is cut off. The integrated panel 7 includes a portion to be the glass panel unit 1A (hereinafter defined as a "glass panel unit portion 101") and an unnecessary portion (hereinafter defined as an "unnecessary portion 102"). The glass panel unit portion 101 includes the depressurized space 50. The unnecessary portion 102 has the exhaust passage 201.

In FIGS. 7D and 8C, the cutting line of the integrated panel 7 is indicated by the broken line (i.e., the cutting line CL). The integrated panel 7 may be cut off along the outer edge of the frame member 30 of the portion to be the glass panel unit 1A eventually. The integrated panel 7 is cut off along an appropriate line so that the depressurized space 50 is not destroyed.

When the integrated panel 7 is cut off, the unnecessary portion 102 is removed, and the glass panel unit portion 101 is taken out. The glass panel unit 1A is obtained from this glass panel unit portion 101. Cutting off the first glass body 100 and the second glass body 200 forms a cut face at the end of the first glass pane 10 and the second glass pane 20 of the glass panel unit 1A. The glass panel unit 1A has a cut face. The glass panel unit 1A of the second embodiment is thus manufactured.

Also in the second embodiment, a window frame 2 is attached to the glass panel unit in a similar manner to the first embodiment, thereby forming a glass window 3 (see FIG. 3). Also in the second embodiment, the glass window 3 including the glass panel unit 1A is attached to a building 4 (see FIG. 4).

Note that a variation of the second embodiment includes an aspect in which the integrated panel 7 serves as is as a glass panel unit. In this case, the exhaust passage 201 may be sealed with a sealing member such as a cap to improve the appearance. Note that the evacuation space 51 recovers the ordinary pressure and remains in the glass panel unit. In this case, reducing the volume of the evacuation space 51 enables the thermal insulation properties to be further improved. Even when the evacuation space 51 remains, the presence of the depressurized space 50 enables the glass panel unit (variation of the second embodiment) to express high thermal insulation properties. In this variation, the exhaust port mark is provided to the glass panel unit.

Third Embodiment

Figure 9:
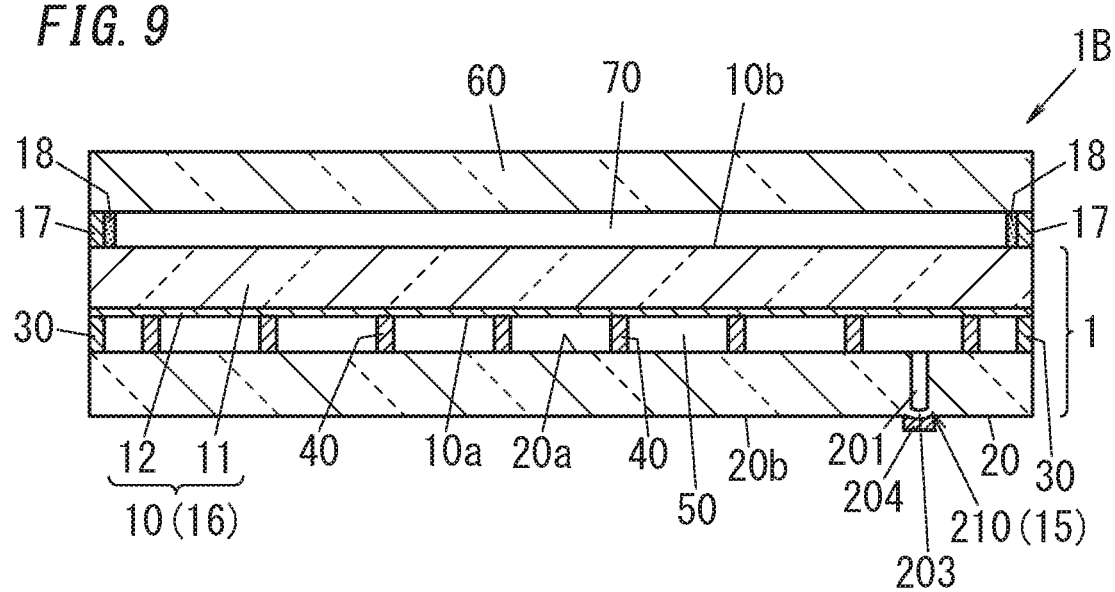
FIG. 9 is a sectional view illustrating a glass panel unit of a third embodiment.

FIG. 9 shows a glass panel unit of a third embodiment. FIG. 9 is a sectional view. FIG. 9 schematically shows the glass panel unit, and similarly to FIGS. 1A and 1B, the dimensions of respective portions thereof are not necessarily to scale and may be different from actual ones. Note that a plan view of a glass panel unit 1B corresponds to FIG. 1B and can be understood from FIG. 1B.

The glass panel unit 1B of the third embodiment includes the glass panel unit 1 of the first embodiment therein. The glass panel unit 1 of the first embodiment is as described above.

The glass panel unit 1B of the third embodiment includes a third glass pane 60 in addition to a first glass pane 10 and a second glass pane 20. The third glass pane 60 is disposed to face a second surface 10b of the first glass pane 10 or a second surface 20b of the second glass pane 20. One of the first glass pane 10 and the second glass pane 20 is defined as an intermediate glass pane 16. The intermediate glass pane 16 is one of the three glass panes (the first to third glass panes) which is disposed between the other two glass panes. In FIG. 9, the intermediate glass pane 16 includes the first glass pane 10. The third glass pane 60 faces the intermediate glass pane 16 (the first glass pane 10). The glass panel unit 1B further includes an adhesive body 17 which has a frame shape and which the third glass pane 60 and the intermediate glass pane 16 (the first glass pane 10) are bound together through. Between the third glass pane 60 and the intermediate glass pane 16, a closed space 70 is provided. In the present embodiment, the closed space 70 is provided, and therefore, the thermal insulation property of the glass panel unit 1B is further improved.

The closed space 70 may be a hermetically closed space with gas therein. The gas may be under an ordinary pressure. The closed space 70 expresses a thermal insulation property since the flow of the gas is limited. Examples of the gas include air, noble gas, and nitrogen. The gas is preferably inert gas. For example, when argon gas is contained in the closed space 70, the thermal insulation property is improved.

The closed space 70 may be a depressurized space (or even a vacuum space). In this case, the closed space 70 is an additional depressurized space. Note that for ease of manufacturing, the closed space 70 does not have to be in a reduced pressure state.

The adhesive body 17 binds the intermediate glass pane 16 (the first glass pane 10) and the third glass pane 60 together. The adhesive body 17 may include an adhesive such as a resin. Examples of the material for the adhesive body 17 include butyl rubber and a silicon resin. The inner side of the adhesive body 17 may be caulked with a caulking agent such as a poly sulfide-based sealant.

The closed space 70 is preferably in a dried state. In the dried state, for example, the humidity is preferably 10% or lower, and more preferably 1% or lower. When the closed space 70 is in the dried state, the thermal conductivity decreases, which enables the thermal insulation property to be improved. In the present embodiment, the closed space 70 is provided with a desiccant 18. The desiccant 18 is disposed on the inner side of the adhesive body 17. Providing the desiccant 18 in the closed space 70 enables the dried state in the closed space 70 to be maintained. Thus, it is possible to improve the thermal insulation property of the glass panel unit 1B. The desiccant 18 is, for example, silica gel. The desiccant 18 may be held by a frame member such as an aluminum frame.

Note that the intermediate glass pane 16 may include the second glass pane 20 (variation of the third embodiment). In this case, the third glass pane 60 is disposed to face the second glass pane 20. The closed space 70 is provided between the second glass pane 20 and the third glass pane 60. This variation also provides an effect similar to the above-described effect.

The glass panel unit 1B of the third embodiment may be manufactured by further disposing the third glass pane 60 over the glass panel unit 1 of the first embodiment. An adhesive forming the adhesive body 17 is provided, for example, along the outer edge of the glass panel unit 1 or along the outer edge of the third glass pane 60, and the adhesive binds the glass panel unit 1 and the third glass pane 60 together, thereby providing the glass panel unit 1B. At this time, gas under an atmosphere at the time of binding may be sealed in the closed space 70. For example, when the binding is performed under the presence of inert gas, the inert gas is filled in the closed space 70.

Also in the third embodiment, a window frame 2 is attached to the glass panel unit in a similar manner to the first embodiment, thereby forming a glass window 3 (see FIG. 3). Also in the third embodiment, the glass window 3 including the glass panel unit 1B is attached to a building 4 (see FIG. 4).

Thus, as can be clearly seen from the first to third embodiments and their variations described above, a glass panel unit of a first aspect includes a first glass pane 10 including at least a plate glass, a second glass pane 20 including at least a plate glass facing the first glass pane 10, a frame member 30 which has a frame shape and which the first glass pane 10 and the second glass pane 20 are bound together through, and spacers 40 disposed between the first glass pane 10 and the second glass pane 20. A depressurized space 50 is provided between the first glass pane 10 and the second glass pane 20. Each of the spacers 40 contains a resin. The first glass pane 10 is to be an exterior pane. The second glass pane 20 is to be an interior pane. The first glass pane 10 has ultraviolet transmittance lower than ultraviolet transmittance of the second glass pane 20.

The first aspect enables degradation of the resin contained in the spacers 40 to be reduced.

A second aspect is realized in combination with the first aspect. The second aspect further includes an identification structure 15 that allows identification of the first glass pane 10 and the second glass pane 20.

According to the second aspect, which one of the glass panes is the first glass pane 10, that is, the glass pane to be an exterior pane is easily determined.

A third aspect is realize in combination with the first aspect or the second aspect. In the third aspect, the second glass pane 20 has a mark 210 of an exhaust port used when the depressurized space 50 is formed.

According to the third aspect, an exhaust port mark 210 is provided to the second glass pane 20 which is to be installed in the interior. Therefore, the exhaust port mark 210 is less likely to be influenced by exterior impact, and breakage from the exhaust port mark 210 is less likely to occur.

A fourth aspect is realized in combination of any one of the first to third aspects. In the fourth aspect, the first glass pane 10 includes plate-shaped glass and a thin film containing metal.

According to the fourth aspect, the thin film containing metal enables passage of ultraviolet radiation to be effectively suppressed.

A fifth aspect is realized in combination with any one of the first to fourth aspects. The fifth aspect further includes a third glass pane 60 and an adhesive body 17. The third glass pane 60 faces an intermediate glass pane 16 which is one of the first glass pane 10 and the second glass pane 20. The adhesive body 17 has a frame shape. The third glass pane 60 and the intermediate glass pane 16 are bound together through the adhesive body 17. A closed space 70 is provided between the third glass pane 60 and the intermediate glass pane 16.

The fifth aspect further improves the thermal insulation property of the glass panel unit 1B.

A sixth aspect is realized in combination of any one of the first to fifth aspects. The glass window 3 of the sixth aspect includes the glass panel unit 1 according to any one of the first to fifth aspects and a window frame 2 disposed at an outer periphery of the glass panel unit 1.

The sixth aspect enables a glass window 3 having low ultraviolet transmittance to be configured.

REFERENCE SIGNS LIST 1, 1A, 1B Glass Panel Unit
2 Window Frame
3 Glass Window
10 First Glass pane
16 Intermediate Glass Pane
17 Adhesive Body
20 Second Glass Pane
30 Frame Member
40 Spacer
50 Depressurized Space
60 Third Glass Pane
70 Closed Space
210 Exhaust Port Mark (Mark of Exhaust Port)

The invention claimed is:
1. A glass panel unit, comprising:
a first glass pane including at least a plate glass;
a second glass pane including at least a plate glass facing the first glass pane;
a frame member which has a frame shape and which the first glass pane and the second glass pane are bound together through; and
a spacer disposed between the first glass pane and the second glass pane,
a depressurized space being provided between the first glass pane and the second glass pane,
the spacer is formed of a polyimide film including a benzene ring,
the first glass pane being, in use, an exterior pane, the second glass pane being, in use, an interior pane, and
the first glass pane having a transmittance of light in an ultraviolet wavelength range of 300 nm to 400 nm lower than the transmittance of light in an ultraviolet wavelength range of 300 nm to 400 nm of the second glass pane.

2. The glass panel unit according to claim 1, further comprising an identification structure that allows identification of the first glass pane and the second glass pane.

3. The glass panel unit according to claim 1, wherein the second glass pane has a mark of an exhaust port used for when the depressurized space is formed.

4. The glass panel unit according to claim 1, wherein the first glass pane includes plate-shaped glass and a thin film containing metal.

5. The glass panel unit according to claim 1, further comprising:
a third glass pane facing an intermediate glass pane which is one of the first glass pane and the second glass pane; and
an adhesive body which has a frame shape and which the third glass pane and the intermediate glass pane are bound together through, wherein
a closed space is provided between the third glass pane and the intermediate glass pane.

6. A glass window, comprising:
the glass panel unit according to claim 1; and
a window frame disposed at an outer periphery of the glass panel unit.

* * * * *